United States Patent

Appel et al.

[11] Patent Number: 5,429,842
[45] Date of Patent: Jul. 4, 1995

[54] PROCESS AND DEVICE FOR PRODUCING ULTRATHIN LAYERS AND LAYER ELEMENT

[75] Inventors: Gunther Appel, Hattersheim; Jacqueline Bauer, Schwalbach/Taunus; Werner Hickel, Ludwigshafen, all of Germany; Donald Lupo, Kawagoe, Japan; Werner Prass, Mainz; Ude Scheunemann, Liederbach/Taunus, both of Germany

[73] Assignee: Hoechst Aktiengesellschaft, Frankfurt am Main, Germany

[21] Appl. No.: 108,119

[22] Filed: Aug. 17, 1993

[30] Foreign Application Priority Data

Aug. 19, 1992 [DE] Germany .......... 42 27 380.3

[51] Int. Cl.⁶ .............. B05D 1/20; B05C 3/02
[52] U.S. Cl. ............... 427/402; 427/430.1; 427/434.3; 427/434.5; 118/402
[58] Field of Search ............ 118/402; 427/434.3, 427/434.5, 430.1, 402

[56] References Cited

U.S. PATENT DOCUMENTS 5,143,745 9/1992 Maganas et al. .......... 427/8
5,246,498 9/1993 Nitsch et al. ........... 427/434.3

Primary Examiner—Shrive Beck
Assistant Examiner—Katherine A. Bareford
Attorney, Agent, or Firm—Curtis, Morris & Safford

[57] ABSTRACT

In order to continuously produce an ultrathin, ordered layer of amphiphilic molecules on the surface of a polar liquid a directed flow of the polar liquid is produced in a duct which contains the amphiphilic molecules in dissolved or undissolved form on the surface in spread form. In the duct, a duct section having a relatively high flow rate on the surface and comprising a ramp which is arranged at the bottom of the duct and washed over by the polar liquid is provided. This is followed by a duct section having a relatively low flow rate on the surface, in which the flow is dammed up at an obstacle at a liquid level constant with time, so that an ultrathin, ordered layer of amphiphilic molecules is continuously formed in these duct sections at the polar liquid/air interface by compression of the flow. The washed over ramp is movable.

16 Claims, 4 Drawing Sheets

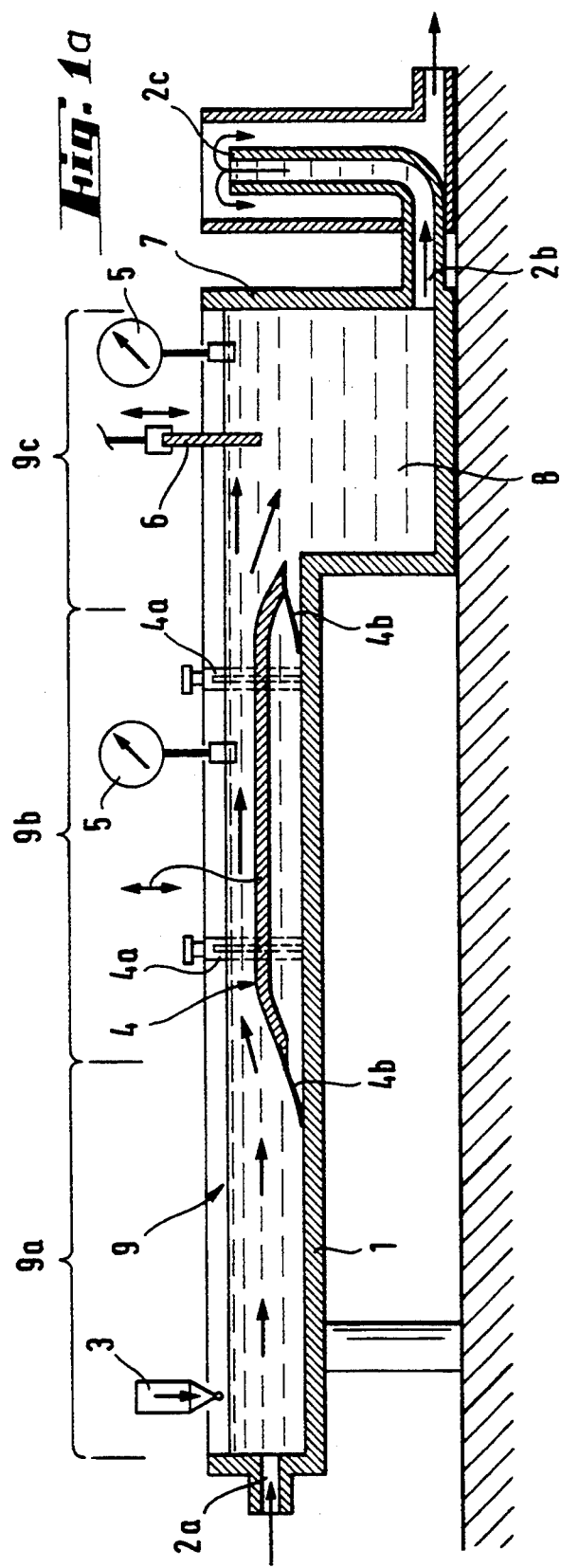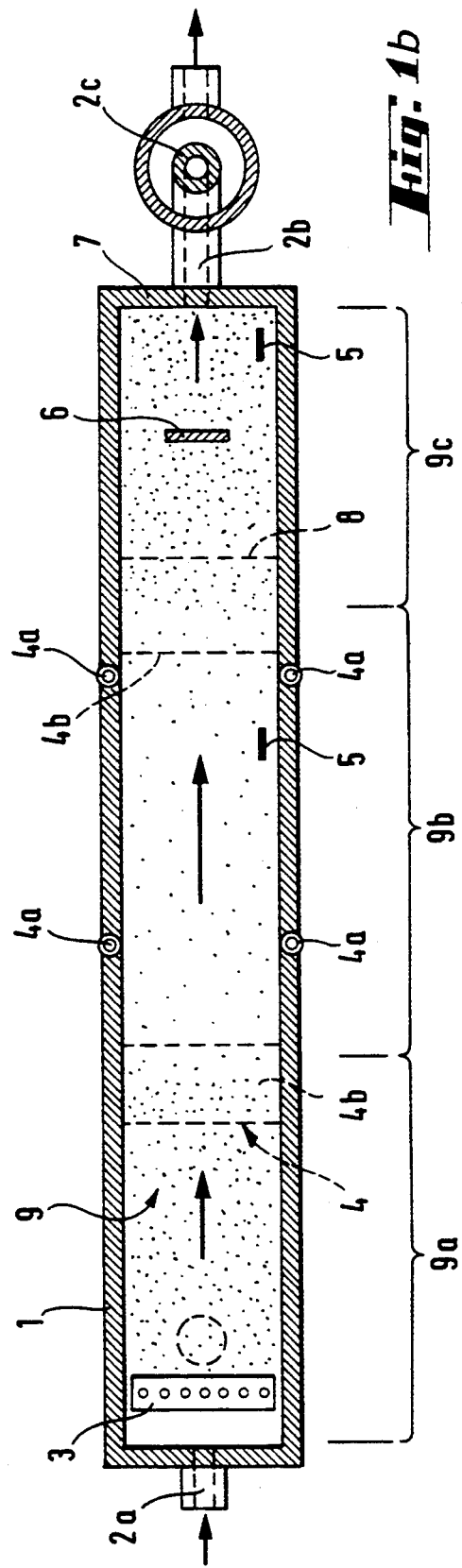

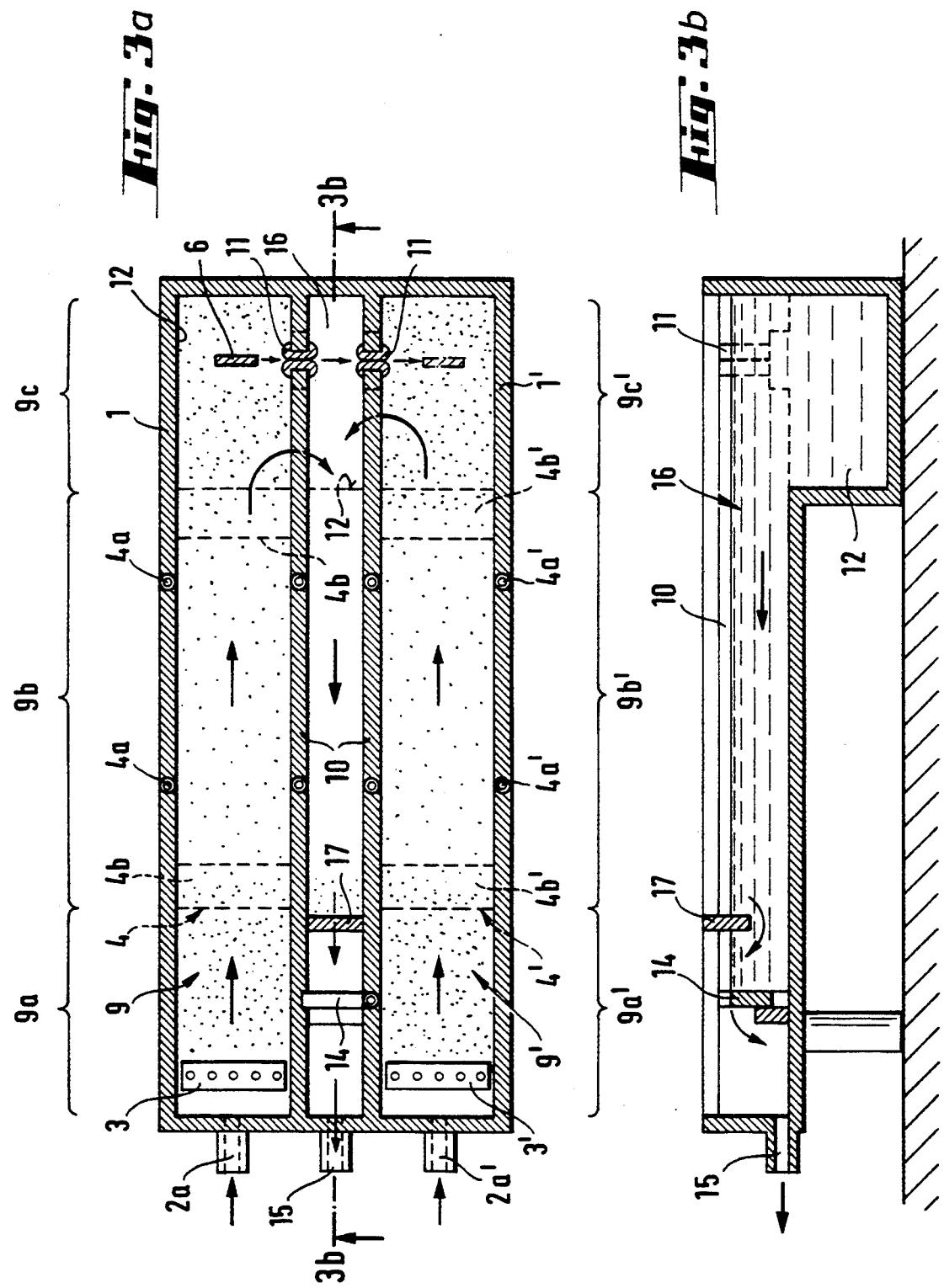

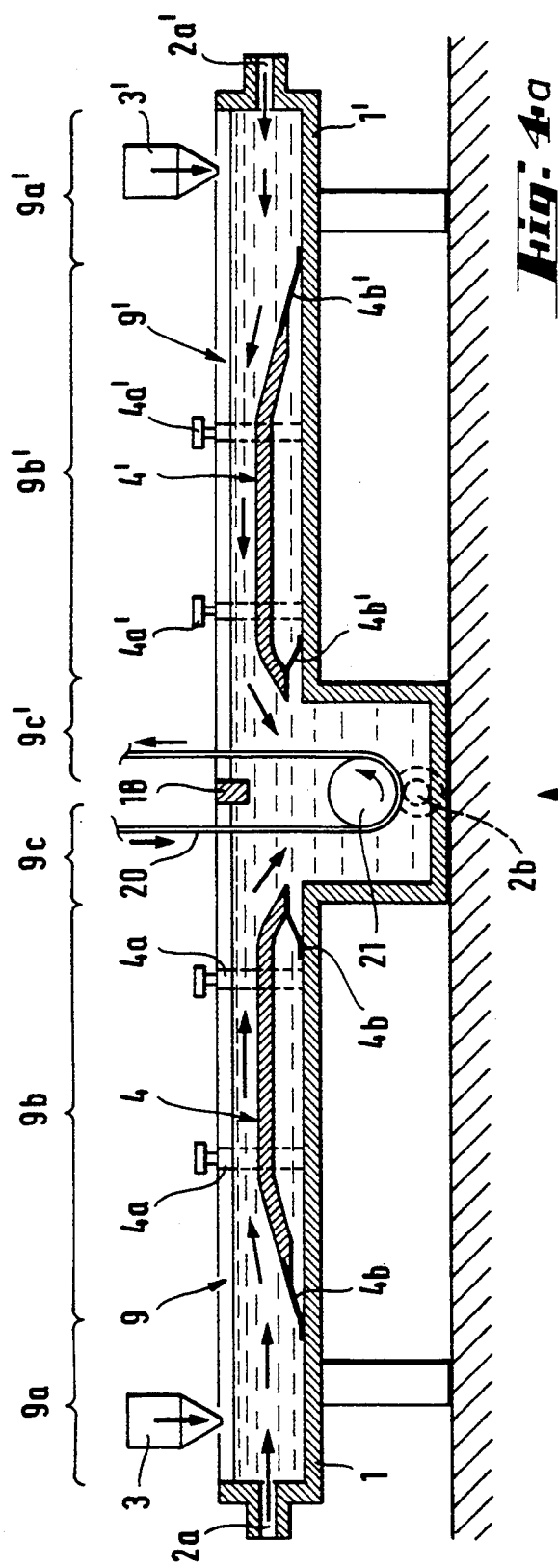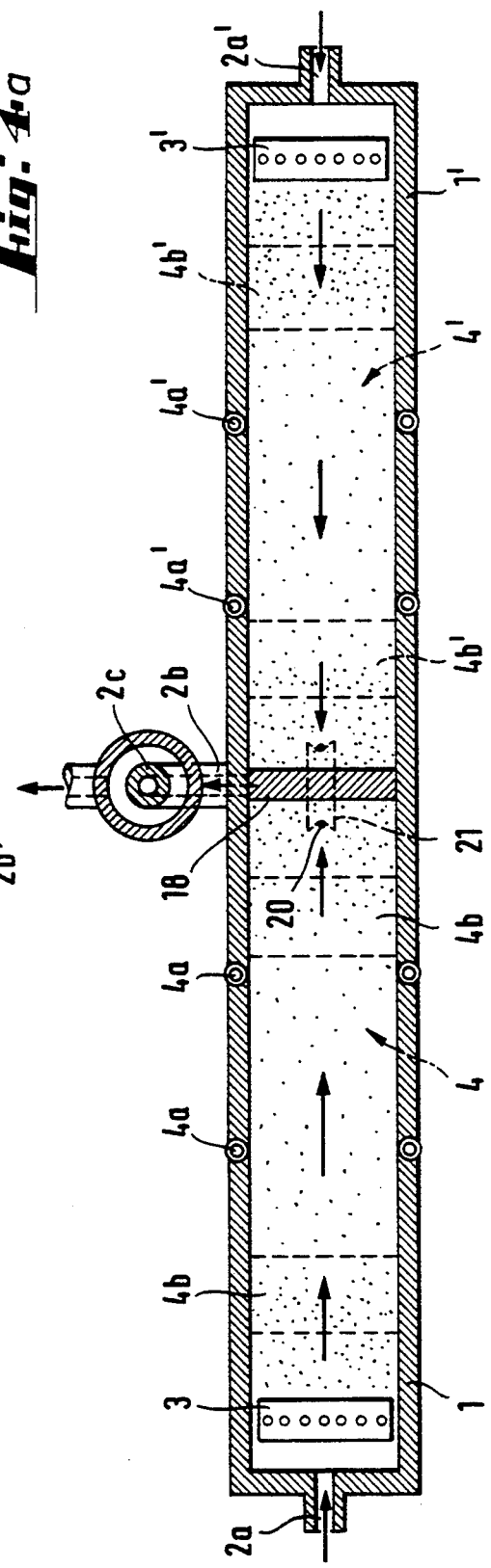

PROCESS AND DEVICE FOR PRODUCING ULTRATHIN LAYERS AND LAYER ELEMENT

FIELD OF THE INVENTION

The invention relates to a process and a device for producing an ultrathin layer of an amphiphilic compound on the surface of a polar liquid, in particular on a water surface, and to a process and devices for transferring such ultrathin layers to a substrate with the formation of a layer element. In the processes for producing ultrathin layers on liquid surfaces, boundary layers are produced at a liquid/gas interface, in particular at a water/air interface, by spreading or by adsorption from the liquid and compressed by causing the liquid to flow through one or more flow ducts. These boundary layers can be transferred to solid substrates by the Langmuir-Blodgett method. The ultrathin layers are thinner than 30 nm. If the amphiphilic compounds do not constitute polymers, the layers are monomolecular.

BACKGROUND OF THE INVENTION

One method of producing and transferring monomolecular layers (Langmuir-Blodgett method) is described by Langmuir (J. Am. Chem. Soc. 57 (1935) 1007–1010). In the conventional method for producing these layers, amphiphilic molecules which are not water-soluble are spread in the form of a solution on a water surface of a so-called Langmuir trough. After the solvent has evaporated, the molecules are compressed to an unbroken film by reducing the water surface area available to them until the compression state is suitable for transferring the film. The reduction in surface area is effected by moving a solid barrier or else by displacing a one-piece flexible band which encloses the amphiphilic molecules on the water surface. Transfer of the film from the water surface to a substrate is effected by immersing or withdrawing the substrate through the film-covered water surface. In particular, by repeating the dipping processes it is possible to transfer multilayers. Such multilayers are currently of great interest for various applications, for example in sensorics, optics and electronics.

However, when relatively large substrates are coated with multilayers, the conventional method for producing the layers is very complicated. Owing to the fact that the film available on the water surface is used up after a few film cycles, dipping production by means of the above-described processes of fill spreading, solvent evaporation and compression of the film have to be repeated in order to enable coating of the substrate to be continued.

The literature describes a number of methods which, in order to eliminate this problem, are directed towards a continuous production of the film on the water surface. Barraud et al. (Thin Solid Films 99 (1983) 221) describe a continuous technique in which the film is compressed by means of rotating rollers. The disadvantage of this method is that the structure of the compressed fill is impaired by the shearing movements near the rollers, especially near the edges thereof.

U.S. Pat. No. 4,722,856 describes a process in which the spread molecules are compressed by causing the water to flow from a higher zone of the trough via an incline into a lower zone. As the water flows down the slope, the amphiphilic molecules flow along with the water on the water surface and are dammed up in the lower trough zone to give a compressed film. Shearing movements in the film at the edges of the incline may give rise to an impairment of film quality. This is the reason why in one trough type the lower zone is designed in the form of a circle in order to ensure that the incline surrounds the entire lower zone, so that no edges are present.

A further process for the continuous production of compressed films on a water surface is described in European Application 0,433,325. In this process, the film is compressed at a horizontally arranged weir by having the water flow in a duct in order to decrease the cross-section and to increase the flow rate, the duct may exhibit a ramp at the bottom. The force necessary for compressing the film is exerted on the film as frictional force of the water, the film covering the liquid of the flow duct. The degree of film compression power is dictated by the shape and length of the duct, by the amount of water flowing through it per unit time and by the water level in the compression zone of the duct, which in turn is influenced by the flow rate. This interaction makes it difficult to adjust and control the compression state.

Various amphiphilic materials show, as a film on the water surface, a pronounced aging behavior, such as is, for example, the case with 22-tricosenoic acid. This may have the effect that optimum transfer of the film to substrates is only possible in certain aging states. In conventional batchwise processes, the residence time of a film once obtained from spreading or compression can only be set to a specific value prior to transfer of the first layer, since, as soon as the first layer is transferred, the compressed film undergoes additional aging during the time necessary for transferring the layers. In contrast, in continuous processes, the film residence time, after a running-in phase, remains constant from compression to transfer, which enables transfer of a uniformly aged film. However, in the known methods, the residence time is largely fixed by reasons of design and hardly adjustable. One way of adjusting it is given in those cases where, in addition to the transfer process, film material is removed from the water surface in a different manner, for example by suction. However, this is disadvantageous because it results in increased consumption of material and entails additional control requirements.

Certain applications of Langmuir-Blodgett layers, for example in non-linear optics, or pyroelectrically active layers require hetero multilayer systems or alternating layer systems. These are those multilayers in which successive immersion/withdrawal processes transfer different layer materials; for example, upon immersion of the substrate, a film of type A and, upon withdrawal, a film of type B are transferred, and by repeating this sequence alternating multilayer systems are built up. Processes enabling such layers to be produced are described, for example, in EP 0,183,426 A2 and in GB 2,165,471 A.

These processes for producing alternating layer systems operate according to the conventional principle of film compression by means of barriers. In this method, two devices for compressing two films in a Langmuir trough are combined in such a manner that a joint water phase is present and the substrate to be coated is immersed in the water through one film, transported by means of a suitable mechanical transporting device below the water surface to a position below the other film and withdrawn there again through the other film. Above the water surface, the substrate is conveyed to the starting point, and the coating cycle can start again. GB 2,165,471 too already describes an arrangement in which two chambers containing a subphase on whose surface monomolecular layers of a first and second amphiphilic compound were produced are separated by a wall which separates the subphases at least on the surface of the liquid and contains a sluice for a substrate.

The known processes for producing alternating multilayer systems also have the disadvantage, as described above, that with increasing size of the substrate surfaces to be coated layer production becomes more and more complicated due to limitations of the available film areas on the water. On the other hand, the known continuous processes for layer production are not suitable for alternating multilayers, in particular not for producing high-quality layers.

OBJECTS AND SUMMARY OF THE INVENTION

The object was to find a process in which surface films composed of amphiphiles, for the purpose of subsequent transfer to substrates, can be continuously compressed on the water surface and in which the compression state optimum for transfer can be easily adjusted in a reproducible manner. The quality of the transferred layers should not be impaired by the compression process. Furthermore, the process should make it possible to adjust the residence time of the compressed film on the water surface within very wide limits. A further object was to design, for the purpose of producing hetero multilayers or alternating multilayers on a substrate, two continuously operating flow ducts for surface compression of amphiphilic layers on a subphase in such a manner that despite communicating subphase, the flow pressure required can be established separately in each system.

These objects are achieved by the present invention. There is accordingly provided a process for the continuous production of an ultrathin, ordered layer of amphiphilic molecules on the surface of a polar liquid, in which a directed flow of the polar liquid containing the amphiphilic molecules in dissolved or undissolved form on the surface in spread form is produced in a duct, a duct section having a relatively high flow rate on the surface is provided in the duct, this duct section comprising a ramp which is arranged on the bottom of the duct and washed over by the polar liquid, and, following this section, a duct section having a relatively low flow rate on the surface is provided, in which the flow is dammed up at an obstacle at a water level constant with time, so that an ultrathin, ordered layer of amphiphilic molecules is continuously formed in this duct section at the polar liquid/air phase boundary by flow compression. This process is distinguished by the fact that the washed over ramp is movable.

BRIEF DESCRIPTION OF THE DRAWINGS

FIG. 1(a) illustrates a side section view of a preferred device for coating substrates.

FIG. 1(b) is a top view of the preferred device illustrated in FIG. 1(a).

FIG. 3(a) illustrates a top section view of an embodiment of a device which is suitable for batchwise coating of rigid substrates with multilayers comprising two different substances.

FIG. 3(b) is a side section view of the device depicted in FIG. 3(a).

FIG. 4(a) is a side section view of a device for producing and transferring films suitable for continuous transfer of two different surface films to wire- and belt-line substrates.

FIG. 4(b) is a top section view of the device illustrated in FIG. 4(a).

DETAILED DESCRIPTION OF THE INVENTION

Figure 2:
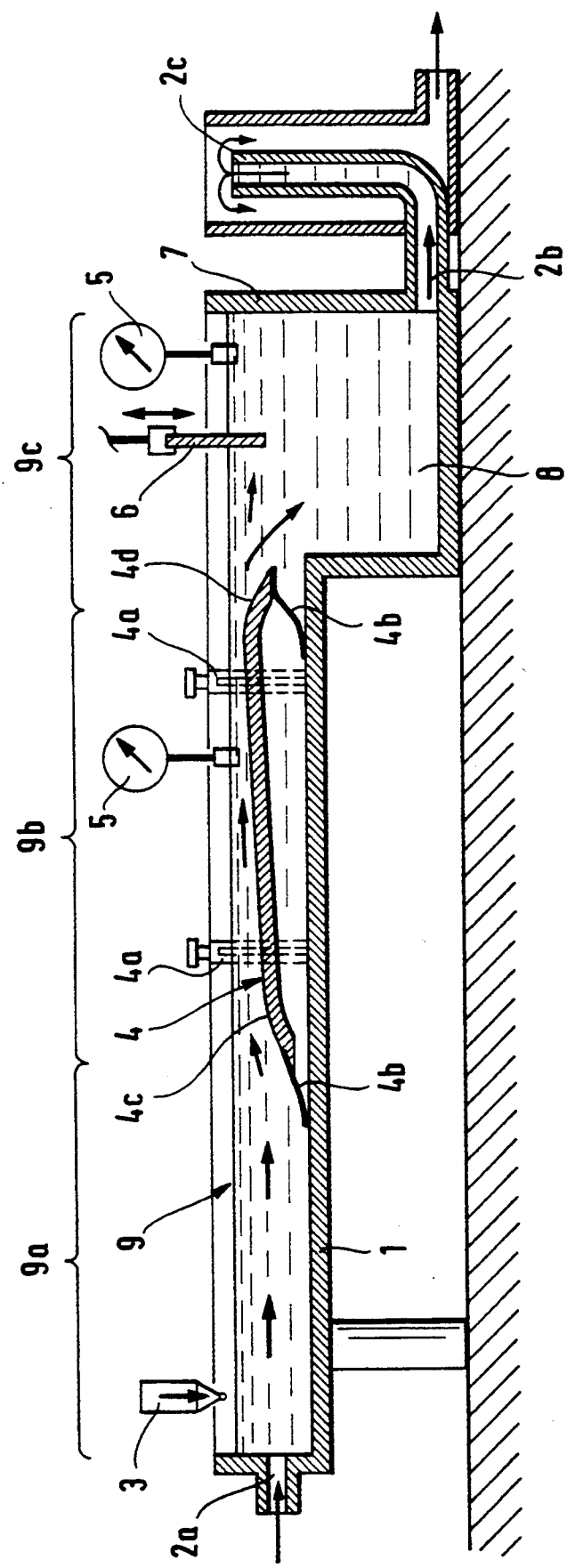
FIG. 2 illustrates a side section view of a device for coating substrates which has flow ducts that can be adjusted to their height and also sloped in the direction of flow relative to the water surface.

According to one embodiment of this invention, the ramp can be moved along the flow duct. The further the ramp is from the flow obstacle, the longer the film is formed by compression on the surface. The cross-section in this duct section, and thus the flow rate, can be varied by adjusting the height of the ramp. A higher flow rate (a smaller cross-section) favors the formation of an ultrathin layer of amphiphilic molecules in front of the flow obstacle. The height adjustment is most easily carried out from above by suspension on the duct walls. However, it must be ensured that the ramp closes tight at the bottom and leaks only an insignificant amount of subphase, preferably less than 5% of the flow. One way of ensuring this is to provide at at least one point of this duct section on the bottom transverse to the flow direction a pocket into which a height-adjustable plate connected to the ramp engages tightly from above. It is also possible to attach one half wedge in each case at the bottom and at the mobile ramp and effect a height adjustment of the ramp by an intermediate wedge which extends transversely to this duct section and is forcibly controlled from the outside. Furthermore, a rigid ramp which is arranged to be height-adjustable can be sealed tight by means of at least one flexible lip at the bottom of the duct. For example the lip itself can be rigid, made, for example, of PTFE or steel, and connected, on the one hand, to the bottom of the duct and, on the other, to the ramp in each case by means of a flexible plastic band. Another possibility is to make the lip itself in a rubber-elastic material. Preferably, the ramp has a minimum length of 5 cm. If the upper side of the ramp is flat, which is advantageous, it is also possible to adjust the slope of the ramp.

The obstacle for the flow in the flow duct can be a confining end face wall of the duct, a weir on the water surface of the duct or the substrate to be coated itself. In the latter case, it is advantageous if the width of the substrate is identical to the duct width.

A device according to the invention for the continuous production of an ultrathin layer of amphiphilic molecules on the surface of a polar liquid contains a) at least one flow duct for receiving a liquid and comprising a duct section having a relatively small cross-section and a ramp attached to the bottom of the duct, and following this duct section in the direction of flow, a duct section having a relatively large cross-section which is delimited in the direction of flow by an obstacle, b) a device for producing the flow of liquid, containing b1) means for removing flowing liquid near the flow obstacle and b2) means for injecting liquid, and c) a device for injecting amphiphilic molecules.

This device is such that the ramp at the bottom of the duct is movable. Preferably, the cross-section ratio of the duct sections having a relatively large and relatively small cross-section is at least 1.1:1, preferably at least 1.5:1, in particular at least 5:1. Insoluble and sparingly soluble amphiphiles are applied in dissolved form near the application point of the (polar) liquid. In the case of soluble amphiphiles, the point of addition is not critical.

Transfer of the compressed film to a substrate can take place in a manner known per se by the method described by Langmuir and Blodgett. Repeated immersion and withdrawal of the substrate makes it possible to produce multilayers on top of each other. However, continuous transfer, for example, to wires or bands which are transported lengthwise through the film via, for example, deflecting rollers, is also possible.

The film-forming spreadable material can be composed of ionic or nonionic low-molecular-weight amphiphiles or polymers. In the case of polymers, suitable polymers include those not exhibiting a typical amphiphilic structure. It is possible to use pure compounds or mixtures.

The gas phase used above the film can be inert gases or else gases or gas mixtures which do react with the film. In most cases, air can be used. The polar liquid used is usually water. However, aqueous solutions, glycerol or mixtures are also suitable.

The flow in the duct can be laminar or turbulent. However, it is favorable if it is as largely laminar as possible so as not to impair the structure and homogeneity of the film by shearing movements.

The water level (level of the polar liquid) in the flow duct can be kept constant with respect to time by maintaining the amount fed in and discharged at the same level. Upon extended operation, it may therefore be necessary to replenish evaporated liquid, in which case control of the liquid level is advantageous. However, it is more favorable to keep the level of the liquid constant by means of an overflow, which may comprise, for example, a vertical tube which is open at the top as a discharge or a vertical wall with the discharge being behind the wall. In the latter case, the upper edge of the wall determines the level of the liquid.

In its basic plan, the flow duct can comprise constrictions (for increasing the flow velocity) and widenings.

Advantageously, the width of the duct is uniform from the point of spreading up to the point at which the film is transferred to the substrate. Near the inlet of the liquid, the duct is preferably relatively deep (large cross-section) in order to ensure a relatively slow flow of the liquid in this section. Likewise, the duct could be flat at this point and in exchange have a larger width. The film-forming material is spread on this section and, given the slow flow, the solvent in which the amphiphilic molecules are dissolved has enough time to evaporate. This section is followed by the section having a relatively high flow rate (flat cross-section). In this section the movably arranged ramp is present. Towards the bottom of the duct, the ramp is sealed tight so that virtually the entire amount of liquid has to flow above the ramp at a high speed. The adjustment of the height of the ramp enables an adjustment of the strength of film compression without affecting anything else. This flat duct section is followed again by a deeper duct section in which film transfer takes place. The compression state on the various duct sections can be measured by means of Wilhelmy balances.

In a particular embodiment of the process according to the invention for film production on the surface of the polar liquid, the residence time of the compressed film on the surface and thus its aging time can be adjusted for the purpose of better transfer behavior. The important feature of this embodiment is to change the length of the monomolecular film formed in front of the flow obstacle at the liquid/air interface. This can be achieved, for example, by giving the ramp in the flow direction an uphill or downhill slope. It is advantageous if the slope can be adjusted during operation. Preferred angles of slope are between −20 degrees and +20 degrees. This makes it possible to set different profiles of the compression state along the flat duct section. These measures have the effect that the residence time of the compressed film can be set within wide limits and the residence time can be adapted to the optimum aging state for the particular film-forming material. Another way of setting the residence time is to shift the ramp horizontally against the direction of flow (longer residence time) or in the direction of flow (shorter residence time).

A device according to the invention for coating a substrate with individual layers or multilayers of a spreadable compound contains the following essential components:

1. A duct for the directed flow of a polar liquid. In the duct, there is a duct section having a relatively large cross-section and comprising a ramp movably attached to the bottom of the duct, for example a height-adjustable and/or slope-adjustable ramp for variably increasing the flow rate and for adjusting the compression state and the residence time of the surface film. This is followed in the direction of flow by a duct section having a relatively large cross-section and being delimited in the direction of flow by an obstacle.
2. A device for producing the liquid flow.
3. A device for spreading the film-forming material.
4. A device for transferring the film to substrates by immersion and withdrawal through the film-covered liquid surface.

The duct may comprise a gradient so that the liquid flows by itself. To keep the level of the liquid constant, an overflow over which the liquid flows into a reservoir may be present near the duct. From this reservoir, the liquid can be returned to the inlet of the duct by means of a pump. Between pump and inlet, devices may be present for temperature-controlling the liquid and keeping it pure.

The channel should have a minimum length, enabling formation of a uniform directed flow. The surface of the duct can comprise narrowed sections or widenings. However, advantageously, the duct surface has a uniform width. Around the ramp, the duct preferably has a rectangular cross-section. In the other sections, the form of the cross-section can differ therefrom.

The shape of the ends of the height-adjustable ramp in the duct is such that inflow and discharge of the liquid from the ramp section takes place, as far as possible, in a uniformly directed flow, and the flow rate shows the minimum possible change over the cross-section of the duct. The height adjustment can, for example, be effected by supporting the ramp by two or more stands which can be moved vertically from the outside. Below the ramp, a tight seal against the bottom of the duct is present which prevents liquid flow below the ramp.

Spreading of a solution of the film-forming material can be effected, for example, by means of a syringe needle or a PTFE capillary. In the case of wide flow ducts, a comb-like arrangement of a plurality of capillaries or needles is preferable. Another favorable device is one in which the solution can be added from a narrow opening. Metered addition of the solution can take place manually but is better done by means of an automatic metering device, for example a motor-driven burette.

Devices for immersion and withdrawal of a substrate in a liquid are known to one skilled in the art from the Langmuir-Blodgett method. Devices for continuous immersion and withdrawal or passage of wire- or belt-like substrates through liquid surfaces are also known to one skilled in the art.

It is also possible to combine two or more flow ducts of the type described above in one trough with a joint polar liquid phase and use them for producing alternating multilayer systems. The adjustable ramps in the ducts make it possible to establish the compression state and the residence time for films made of different substances independently of one another and without affecting any of the other films.

In the case of batchwise film transfer to rigid flat substrates, a parallel arrangement of the ducts having the same direction of flow is favorable. In this arrangement, sluices through which a holding device for the substrate to be coated can be guided are present near the point of layer transfer in the side walls of the duct at the level of the liquid surface, and below the sluices cutouts are present in the side walls so that the substrate when immersed can be transported below another film without any mixing of the surface films taking place. It is particularly advantageous if there is between the sluices a zone of the liquid surface which is not covered by any films. In this manner, mutual mixing of the surface films can be excluded entirely. During immersion in and withdrawal from the film-covered polar liquid, the substrate surface to be coated is preferably aligned against the direction of flow in the duct.

In the case of continuous coating of flexible wire- or belt-like substrates, no sluices are required in the wall which separates both duct systems at the surface. In this case, the wire or the belt is led through cutouts in the duct wall disposed below the surface so that upon immersion and withdrawal different film materials can be transferred. For guiding such substrates, rollers can be used which are present above or below the liquid surface.

When belts are coated with two different types of films, a frontal arrangement of the two ducts is particularly advantageous, the cutout for leading the substrate through being present in the Joint front wall of the ducts. The belt surface to be coated is in each case directed against the direction of flow. This ensures good layer quality.

One embodiment of the invention provides a process for successively coating a rigid substrate with ultrathin, regularly arranged films of a first and a second amphiphilic compound, in which a film of the first amphiphilic compound is produced in a first chamber by spreading and compression at the polar liquid/air interface and a film of the second amphiphilic compound is produced in a second chamber, the phases of the polar liquid in both chambers are allowed to communicate with one another and the chambers are separated from one another at the surface by at least one wall comprising a sluice, a substrate is immersed in the surface of the first chamber, as a result of which it is coated with the film of the first amphiphilic compound, the substrate is moved while immersed through at least one sluice into the second chamber, and there it is withdrawn, as a result of which it is coated with a film of the second amphiphilic compound. In this embodiment of the process the first chamber and the second chamber are each of a device as mentioned above for transferring a continuously formed ultrathin layer of amphiphilic molecules to a substrate. Alternatively, transfer of a layer can also be effected by immersing the substrate outside the first chamber, transporting it while immersed through at least one surface sluice into the first chamber, withdrawing it there, as a result of which it is coated with the film of the first amphiphilic compound, immersing the substrate in the second chamber, as a result of which it is coated with the film of the second amphiphilic compound, and removing the substrate while immersed from the second chamber through at least one surface sluice.

A preferred device for coating substrates is shown in FIG. 1a and FIG. 1b: the flow duct (1) is used for producing a directed flow of a polar liquid. The liquid enters the flow duct via inlet 2a, leaves it again via 2b and overflow 2c. The overflow serves for keeping the level of the liquid in the duct constant. Thereafter, the liquid flows into a buffer vessel (not shown) and can be returned from there again to inlet 2a by means of a suitable pump (also not shown), passing, if desired, through purification units such as filters and the like inserted between the buffer vessel and inlet 2a. However, it is also possible to discard the liquid if new liquid is introduced at 2a. Ramp 4 causes a vertical narrowing of the flow duct. The flexible seal 4b tightly seals the ramp against the bottom so that the liquid must continually flow above the ramp at an increased rate. The height of the ramp can be adjusted by means of suspension devices 4a so that the narrowing of the duct and thus the flow rate of the liquid above the ramp can be varied within wide limits.

By means of the injection device 3, which can be, for example, a syringe needle or a PTFE capillary, film-forming material in a suitable spreadable solvent is placed on the liquid surface and spread. The slow upstream flow in zone 9a in front of the ramp should give the solvent enough time for evaporation until the spread molecules have reached the beginning of the ramp. There, owing to the rapid flow, a force in the direction of flow is exerted on them in zone 9b, thus compressing the film, until, shortly after the end of the ramp, the compression state necessary for optimum transfer is reached at the point of film transfer (zone 9c) to substrate 6. Preferably, each of zones 9a, 9b and 9c has a length of at least 5 cm. The film is dammed up at the right-hand delimiting wall 7 of the duct (front wall). The strength of compression can be measured by means of Wilhelmy balances 5. The optimum compression state can be adjusted reproducibly and exactly by height adjustment of ramp 4 by means of device 4a without affecting the level of the liquid in the duct, as can be the amount of flow entering per unit of time at 2a and leaving again at 2b. Substrate 6 is immersed and withdrawn again through the film using a suitable mechanical device (film lift), resulting in transfer of the film and formation of multilayers on the substrate. The purpose of depression 8 of the duct is also to enable long solid substrates to be immersed to a sufficient depth.

In a particular design the flow ducts cannot only be adjusted with respect to their height but also sloped in the direction of flow relative to the water surface, as shown in FIG. 2. This means that during the coating operation the point at which the strongest film compression takes place or the compression profile of the compressed film in the direction of flow can be varied. In FIG. 2, side 4c of the ramp facing liquid inlet 2a has been lowered and side 4d facing the outlet has been raised. This setting shortens the length of the compressed film and thus the residence time in comparison with the horizontal setting. Conversely, the residence time can also be extended. This makes it possible to adapt the residence time of the film on the water surface up to the time of coating individually and optimally to the requirements of the particular type of film. This is important for films which exhibit in certain aging phases a particularly good or poor transfer behavior, such as is the case, for example, with 22-tricosenoic acid films.

As already mentioned above, a device according to the invention which is particularly suitable for producing hetero multilayers or alternating multilayers contains two or more flow ducts having a Joint liquid phase connected to one another.

An embodiment of this device which is particularly suitable for batchwise coating of rigid substrates with multilayers comprising two different substances is shown in FIGS. 3a and 3b. FIG. 3a shows a plan view and FIG. 3b a vertical longitudinal section through the center of the arrangement.

The two ducts 9 and 9' are arranged in parallel and are provided, also as described above, with liquid inlets 2a (and 2a'), ramps 4 (and 4') and height-adjustment units 4a (and 4a') and seals 4b and 4b' for ramps 4 and 4'. The spreading sites are at 9a (and 9a') and the points for immersion and withdrawal of the substrate at 9c (and 9c'). In order to transport the substrate from one duct to the other while immersed, the inner side walls 10 of duct sections 9c are provided with cutouts 12 and sluices 11 through which the substrate or the substrate holding device can be let without the compressed surface film escaping from zones 9c. Zone 16 between the ducts serves for recycling the polar liquid which flows over overflow 14 into outlet 15. A further function of this zone between the ducts is to entirely prevent mutual mixing of the surface films in both ducts. Small amounts of substances which might enter this zone upon passing through the sluice are transported together with the water flow towards weir 17. There, they are dammed up and can be removed by suction.

Another embodiment of a device for producing and transferring films is suitable for continuous transfer of two different surface films to wire- or belt-like substrates. It is shown in FIGS. 4a and 4b. In this device, the two ducts necessary for this embodiment are arranged head-to-head. The device is again provided with inlets 2a and 2a', ramps 4 and 4' comprising adjustment units 4a, 4a' and seals 4b and 4b', comb-like spreading devices 3, an outlet 2b and an overflow 2c by means of which the level of the liquid is kept constant. The two surface films are separated from one another by a barrier 18 located in the middle between both ducts on the liquid surface. Substrate 20 is guided by means of the immersed roller 21 in such a manner that during immersion it is coated with the surface film on surface 9c and during withdrawal is coated with the surface film on surface 9c'.

The layers produced by the process according to the invention can be used for many purposes. For example, in non-linear optics for parametric effects, in electronic structural components as thin insulating layers or as surface-fixed receptor layers in biosensors. They can also be used in thin selective separating membranes.

The invention is illustrated in more detail by the examples which follow.

EXAMPLE 1

An apparatus comprising a duct according to FIG. 1 was used. The polar liquid used was high-purity water (18 MOhm). The rate of flow was about 1.7 l/min. The duct had a width of 120 mm, and the length of the ramp was about 250 mm. A dilute solution (concentration: 1 g/l) of a polymeric amphiphilic substance was spread onto the water in front of the ramp. The water level in the trough was set at such a value that the film pressure as measured by Wilhelmy balances was about 10 mN/m. The ramp was then raised by 3 turns of the adjusting screws, so that a film pressure of 20 mN/m was obtained. At this pressure, a platelet of purified silicon was immersed through the film-covered water surface, resulting in transfer of the film. Transfer to the silicon platelet was verifiable by contact-angle measurements. The samples were tested for defects using a light microscope. These tests revealed no defects. Ellipsometric determination of the layer thickness gave the same layer thickness per monolayer as also measured on conventionally produced layers of the same substance.

EXAMPLE 2

The same apparatus as in Example 1 was used. A solution of 22-tricosenoic acid was spread. Under the set conditions, the average residence time of the film on the water surface was about 30 minutes. At a film pressure of 25 mN/m 30 monolayers were transferred to a silicon substrate. When viewed under the light microscope the samples showed defects. The water level in the trough was increased to allow tilting of the ramp (cf. FIG. 2). The rear screws were turned until reaching the lowest position, and the front screws were screwed about 4 turns upwards. In this manner, the same pressure was established at the end of the ramp as with the ramp in horizontal position. The residence time of the film on the water surface was about 15 minutes. A silicon substrate was coated with 30 layers and, when viewed under the microscope, was free of defects.

EXAMPLE 3

The apparatus described above containing two parallel ducts according to FIG. 3 was used. The rate of flow per duct was 1.7 l/min. The width of each duct was 120 mm and the length of the ramp about 300 mm. On one duct (A), a non-linear optically active amphiphilic 4-nitrophenylhydrazone (FA06) of 4-n-octadecyloxy-benzaldehyde, and, on the other duct (B), N-octadecylacrylamide OAA were each spread as a dilute solution having a concentration of 1 g/l. With both ramps being positioned at the same level, a film pressure of 10 mN/mm was reached in duct A and a film pressure of 14 mN/m was reached in duct B. The screws in duct A were given 2 turns and those in duct B 2.5 turns to give a pressure of 17 mN/mm in duct A and a pressure of 23 mN/m in duct B. Under these conditions, alternating layers of both materials were transferred. The substrates used were silicon substrates and glass substrates. In order to test the layer structure of the AB layers, ellipsometric and non-linear optical tests were carried out. To this end, 10, 20, 30 and 50 AB layer sequences were transferred to silicon substrates. Determination of the layer thickness using an ellipsometer gave a layer thickness of 6.3 nm per AB layer sequence. For comparison, layers each having the same sequence number and comprising only FA06 or OAA were produced. Determination of the layer thickness by ellipsometry gave a monolayer thickness of 3 nm for OAA and of 3.3 nm for FA06. Hence, the layer thickness of an AB sequence is given by the monolayer thicknesses of the individual layers.

Measurement of the second-order non-linear optical properties in the AB layer systems allows us to determine the orientation of the FA06 layers in the alternating multilayer system and to compare it with the orientation of FA06 monolayers. The measurements were carried out in a Maker Fringe apparatus (Maker et al., Phys. Rev. Lett. 8, 21 (1962)) using FA06 and AB monolayers comprising 10, 20, 30 and 50 layer sequences. The results obtained from these measurements show that the FA06 layers in the AB layer system have the same orientation as in the monolayer.

What is claimed is:

1. A process for continuous production of an ultrathin, ordered layer of amphiphilic molecules on a surface of a polar liquid, which comprises producing a directed flow of the polar liquid containing the amphiphilic molecules in dissolved or undissolved form on the surface of the polar liquid in spread form in a duct, providing a first duct section having a relatively high flow rate on the surface of the polar liquid in the duct, this first duct section having a bottom portion and comprising a movable ramp which is arranged on the bottom portion of the duct and is washed over by the polar liquid, and, following providing this first duct section, providing a second duct section having a relatively low flow rate on the surface of the polar liquid, and damming up the relatively low flow rate at an obstacle at a liquid level constant with time, so that an ultrathin, ordered layer of amphiphilic molecules is continuously formed in these first and second duct sections at a polar liquid/air phase interface and wherein the movable ramp is adjusted during production to adjust the flow rate of the polar liquid in the first duct.

2. The process as claimed in claim 1, wherein the ramp has a height which is adjustable.

3. The process as claimed in claim 1, wherein the ramp is movable toward and away from the second duct section.

4. The process as claimed in claim 1, wherein an upper side portion of the ramp is flat and the ramp is has a slope which is adjustable.

5. The process as claimed in claim 1, wherein the ramp has a length of at least 5 cm.

6. A process for producing a coated substrate which comprises producing an ultrathin layer on a surface of a polar liquid by the process as claimed in claim 1, in which an ultrathin layer of an amphiphilic compound is produced on a polar liquid, a substrate is immersed in the polar liquid through this film and/or withdrawn through this film, as a result of which at least one ultrathin layer of the amphiphilic compound is transferred onto the substrate.

7. A process for consecutive coating of a substrate with ultrathin, regularly arranged films of a first and a second amphiphilic compound using a device for continuous production of a monomolecular layer of amphiphilic molecules on a surface of a polar liquid, containing:
(a) at least one flow duct for receiving a liquid and comprising a bottom portion and a first duct section having a relatively small cross-section and a movable ramp attached to the bottom portion of the duct, and following this first duct section in a direction of flow, a second duct section having a relatively large cross-section which is delimited in the direction of flow by an obstacle;
(b) a device for producing the flow of liquid, containing:
  (i) means for removing flowing liquid near the flow obstacle and
  (11) means for injecting liquid into the duct, and
(c) a device for injecting amphiphilic molecules into the duct,
wherein a first film of the first amphiphilic compound is produced in a first chamber by spreading and compression at a polar liquid/air interface and a second film of the second amphiphilic compound is produced in a second chamber, the phases of the polar liquid in both chambers are allowed to communicate with one another and the chambers are separated from one another at a surface of the polar liquid by at least one wall comprising a sluice, a substrate is immersed in a surface of the first chamber, as a result of which the substrate is coated with the first film of the first amphiphilic compound, the substrate is moved while immersed through at least one sluice into the second chamber, and there it is withdrawn, as a result of which the substrate is coated with the second film of the second amphiphilic compound, wherein the first chamber and the second chamber each represents duct sections having a relatively large cross section and wherein the movable ramp is adjusted during production to adjust the flow rate of the polar liquid in the first duct.

8. The process as claimed in claim 7, wherein the first and the second amphiphilic compound are identical.

9. The process as claimed in claim 7, wherein both flow ducts are arranged in parallel.

10. The process as claimed in claim 7, wherein the two flow ducts are arranged in series and a flow direction of the polar liquid in one of the two flow ducts is opposite to that in the other.

11. The process as claimed in claim 7, wherein the two chambers communicating with one another and having a relatively large cross section are separated by a chamber which is free of surface film.

12. A process for consecutive coating of a substrate with ultrathin, regularly arranged films of a first and a second amphiphilic compound using a device for continuous production of a monomolecular layer of amphiphilic molecules on a surface of a polar liquid, containing:
(a) at least One flow duct for receiving a liquid and comprising a bottom portion and a first duct section having a relatively small cross-section and a movable ramp attached to the bottom portion of the duct, and following this first duct section in a direction of flow, a second duct section having a relatively large cross-section which is delimited in the direction of flow by an obstacle;
(b) a device for producing the flow of liquid, containing:

(i) means for removing flowing liquid near the flow obstacle and

(11) means for injecting liquid into the duct, and (c) a device for injecting amphiphilic molecules into the duct, wherein a first film of the first amphiphilic compound is produced in a first chamber by spreading and compression at a polar liquid/air interface and a second film of the second amphiphilic compound is produced in a second chamber, the phases of the polar liquid in both chambers are allowed to communicate with one another and the chambers are separated from one another at a surface of the polar liquid by at least one wall comprising a sluice, a substrate is immersed outside the first chamber, is transported while immersed through at least one surface sluice into the first chamber, and there the substrate is withdrawn, as a result of which the substrate is coated with the first film of the first amphiphilic compound, the substrate is immersed in a second chamber, as a result of which the substrate is coated with the second film of the second amphiphilic compound, and the substrate is removed while immersed from the second chamber through at least one surface sluice, wherein the first chamber and the second chamber each represent duct sections having a relatively large cross section and wherein the movable ramp is adjusted during production to adjust the flow rate of the polar liquid in the first duct.

13. A continuous process for coating a substrate with ultrathin, regularly arranged films of a first and a second amphiphilic compound, in which a first film of the first amphiphilic compound is produced in a first chamber by spreading and compression at a polar liquid/air interface and a second film of the second amphiphilic compound is produced in a second chamber, the phases of the polar liquid in both chambers are allowed to communicate with one another and the chambers are separated from one another at a surface by a wall, the substrate is immersed in a surface of the first chamber, as a result of which the substrate is continuously coated with the first film of the first amphiphilic compound, the substrate is continuously transported while immersed below the wall into the second chamber, and there the substrate is continuously withdrawn, as a result of which the substrate is continuously coated with the second film of the second amphiphilic compound, wherein the first chamber and the second chamber each represent duct sections having a relatively large cross section and wherein a movable ramp is adjusted during production to adjust the flow rate of the polar liquid in the first chamber.

14. A continuous process for consecutive coating of a substrate with monomolecular, regularly arranged films of a first and a second amphiphilic compound, in which process polar liquid is caused to flow through a first flow duct and a second flow duct, each duct comprising a first duct section with a relatively small cross-section and a bottom portion, and a ramp movably arranged at the bottom portion of the duct, each duct further comprising down stream the first duct section a second duct section having a relatively large cross section which is delimited in the direction of flow by an obstacle, the phases of the polar liquid in the second duct sections of the first and the second flow duct being allowed to communicate with one another and the duct sections being separated from one another at the surface by at least one wall comprising a sluice, wherein a film of the first amphiphilic compound is produced in the first duct section of the first flow duct by spreading and compression at the polar liquid/air interface and a film of the second amphiphilic compound is produced in the first duct section of the second flow duct, the substrate is continuously immersed in the surface of the second duct section of the first flow duct as a result of which it is coated with the film of the first amphiphilic compound, the substrate is continuously moved while immersed through at least one sluice into the second duct section of the second flow duct, and there it is continuously withdrawn as a result of which it is coated continuously with a film of the second amphiphilic compound and wherein the movable ramp is adjusted during production to adjust the flow rate of the polar liquid in the first duct.

15. A device for continuous production of a monomolecular layer of amphiphilic molecules on a surface of a polar liquid, containing:

(a) at least one flow duct for receiving a liquid and comprising a bottom portion and a first duct section having a relatively small cross-section and a movable ramp attached to the bottom portion of the duct, and following this first duct section in a direction of flow, a second duct section having a relatively large cross-section which is delimited in the direction of flow by an obstacle;

(b) a device for producing the flow of liquid, containing:

(i) means for removing flowing liquid near the flow obstacle and (ii) means for injecting liquid into the duct, and (c) a device for injecting amphiphilic molecules into the duct.

16. A device for transferring a continuously formed ultrathin layer of amphiphilic molecules from a surface of a polar liquid to a substrate containing:

(a) at least one flow duct for receiving a liquid and comprising a first duct section having a relatively small cross section and a movable ramp attached to a bottom portion of the flow duct, and, following this first duct section in a direction of flow, a second duct section having a relatively large cross section which is delimited in the direction of flow by an obstacle, (b) a device for producing the flow of liquid, containing:

(i) means for removing flowing liquid near the flow obstacle and (ii) means for injecting liquid into the flow duct, (c) a device for injecting amphiphilic molecules into the flow duct onto the surface of the liquid near the point of injection of the liquid and (d) means for transferring the continuously formed ultrathin layer to a substrate by immersing it in and/or withdrawing it from the liquid covered by the ultrathin layer in the second duct section having a relatively large cross section.

* * * * *